(12) United States Patent
Kilian-Kehr et al.

(10) Patent No.: US 7,673,141 B2
(45) Date of Patent: Mar. 2, 2010

(54) CLIENT AUTHENTICATION USING A CHALLENGE PROVIDER

(75) Inventors: Roger Kilian-Kehr, Darmstadt (DE); Jochen Haller, Karlsruhe (DE); Laurent Gomez, Le Cannet (FR); Cedric Hebert, Mouans Sartoux (FR)

(73) Assignee: SAP Aktiengesellschaft, Walldorf (DE)

( * ) Notice: Subject to any disclaimer, the term of this patent is extended or adjusted under 35 U.S.C. 154(b) by 939 days.

(21) Appl. No.: 10/959,102

(22) Filed: Oct. 7, 2004

(65) Prior Publication Data

US 2005/0268096 A1 Dec. 1, 2005

(30) Foreign Application Priority Data

May 28, 2004 (EP) .................................. 04291338

(51) Int. Cl.
H04L 9/32 (2006.01)
(52) U.S. Cl. ...................................... 713/168; 713/185
(58) Field of Classification Search ................. 713/168, 713/185
See application file for complete search history.

(56) References Cited

U.S. PATENT DOCUMENTS

| | | | |
|---|---|---|---|
| 5,153,919 A * | 10/1992 | Reeds, III et al. ............. 380/44 |
| 5,299,263 A | 3/1994 | Beller et al. |
| 5,930,804 A * | 7/1999 | Yu et al. .................... 707/104.1 |
| 6,338,138 B1 * | 1/2002 | Raduchel et al. ............ 713/155 |
| 6,597,648 B1 * | 7/2003 | Yeo et al. ................... 369/53.2 |
| 6,766,454 B1 * | 7/2004 | Riggins ....................... 713/185 |
| 6,804,357 B1 * | 10/2004 | Ikonen et al. ................ 380/241 |
| 6,940,980 B2 * | 9/2005 | Sandhu et al. .............. 380/282 |
| 7,043,643 B1 * | 5/2006 | Doe et al. .................... 713/189 |
| 7,058,180 B2 * | 6/2006 | Ferchichi et al. ............ 380/247 |
| 7,275,263 B2 * | 9/2007 | Bajikar et al. ................. 726/28 |
| 7,346,170 B2 * | 3/2008 | Asano et al. ................. 380/278 |
| 7,409,705 B2 * | 8/2008 | Ueda et al. ...................... 726/5 |
| 2002/0010857 A1 * | 1/2002 | Karthik ....................... 713/168 |
| 2002/0034301 A1 * | 3/2002 | Andersson .................. 380/270 |
| 2002/0124175 A1 * | 9/2002 | Yamakado .................. 713/185 |

(Continued)

FOREIGN PATENT DOCUMENTS

EP    1 158 745 A    11/2001

(Continued)

OTHER PUBLICATIONS

ZipLip Inc., "Deployment Options", <URL:http://www.ziplip.com/products/gateway/deploy_options.html>, [retrieved on Sep. 18, 2003], 4 pgs.

(Continued)

*Primary Examiner*—Edan Orgad
*Assistant Examiner*—James Turchen
(74) *Attorney, Agent, or Firm*—Fish & Richardson P.C.

(57) ABSTRACT

A system for providing secured access to an application service includes a challenge provider that uses a first cryptographic technique to provide a challenge to a client seeking access to an application service. The client uses a second cryptographic technique to generate a response, and provides the response to an authentication service. The authentication service grants the client access to the application service only if the challenge and response are authenticated using a first authentication technique complementary to the first cryptographic technique and a second authentication technique complementary to the second cryptographic technique, respectively.

21 Claims, 4 Drawing Sheets

U.S. PATENT DOCUMENTS

| | | | |
|---|---|---|---|
| 2003/0012382 A1* | 1/2003 | Ferchichi et al. | 380/270 |
| 2003/0055738 A1* | 3/2003 | Alie | 705/26 |
| 2004/0019787 A1* | 1/2004 | Shibata | 713/168 |
| 2005/0105731 A1* | 5/2005 | Basquin | 380/247 |
| 2005/0268096 A1* | 12/2005 | Kilian-Kehr et al. | 713/168 |

FOREIGN PATENT DOCUMENTS

| | | |
|---|---|---|
| GB | 2 392 357 A | 2/2004 |
| WO | WO 99/00958 A | 1/1999 |

OTHER PUBLICATIONS

"Introduction to SSL", <URL:http://www.developer.netscape.com/docs/manuals/ security/sslin/contents.htm>, [retrieved on Sep. 15, 2003], 12 pgs.

"Operating SAP Systems Securely", <URL:http://www.sapinfo.de/public/en/printout.php4/article/ comvArticle-193353c63aeda5ee6c/en>, [retrieved on Sep. 18, 2003], 2 pgs.

"Secure Network Communication", <URL:http://www.english.schweickert.de/solutions/index_dynamic.cfm?CID=13., [retrieved on Sep. 18, 2003], 1 pg.

\* cited by examiner

CLIENT AUTHENTICATION USING A CHALLENGE PROVIDER

CROSS-REFERENCE TO RELATED APPLICATIONS

This application claims priority to French Application No. 04291338.4, filed on May 28, 2004, and titled CLIENT AUTHENTICATION USING A CHALLENGE PROVIDER, which is incorporated by reference in its entirety.

TECHNICAL FIELD

The disclosure relates to securing access to an application service.

BACKGROUND

Various application services may be available to a client in an enterprise environment. The client may access one or more of those application services using a conventional login, as provided, for example, by the secure sockets layer (SSL) protocol. Conventionally, the login to each application service may require a separate login or separate administration of authentication information or security settings.

Moreover, mobile clients such as mobile telephones or personal digital assistants are becoming pervasive. Mobile clients generally offer less abundant system resources than do conventional fixed clients. Consequently, SSL and other conventional authentication systems may not be suited ideally for implementation within a mobile client.

SUMMARY

In one general aspect, a system for providing secured access to an application service includes a challenge provider that uses a first cryptographic technique to provide a challenge to a client seeking access to an application service. The client uses a second cryptographic technique to generate a response, and provides the response to an authentication service. The authentication service grants the client access to the application service only if the challenge and response are authenticated using a first authentication technique complementary to the first cryptographic technique and a second authentication technique complementary to the second cryptographic technique, respectively.

Implementations may include one or more of the following features. For example, the challenge provider may be configured as physically separate from the authentication service. The authentication service may reside within a middleware service that connects the client and the application service. A mapping service also may be included to map identification information to one or more cryptographic keys.

The client may include a secure storage circuit and a secure execution circuit to generate the response based on the challenge and the second cryptographic technique. A smart card may be used to embody the secure storage circuit and the secure execution circuit. The challenge provider may be used to provide the client with an interface module to interface with the smart card. For example, the interface module may communicate the challenge to the smart card and also may communicate the response to the authentication service.

In one aspect, the challenge provider selects the interface module from one or more available interface modules. For example, the challenge provider may provide the interface module based on a version and/or type of the client. More specifically, the challenge provider may provide the interface module based on a version and/or type of the smart card of the client. The challenge provider may digitally sign the interface module provided to the client.

An administrative service also may be provided. The administrative service may instruct the challenge provider regarding providing the challenge. The challenge provider may be used to centrally control access of more than one client to more than one application service using more than one authentication service.

These general and specific aspects may be implemented using a method, a system, or a computer program, or any combination of systems, methods, and computer programs. Other features will be apparent from the following description, including the drawings, and from the claims.

DESCRIPTION OF DRAWINGS

Like reference symbols in the various drawings indicate like elements.

DETAILED DESCRIPTION

Figure 1:
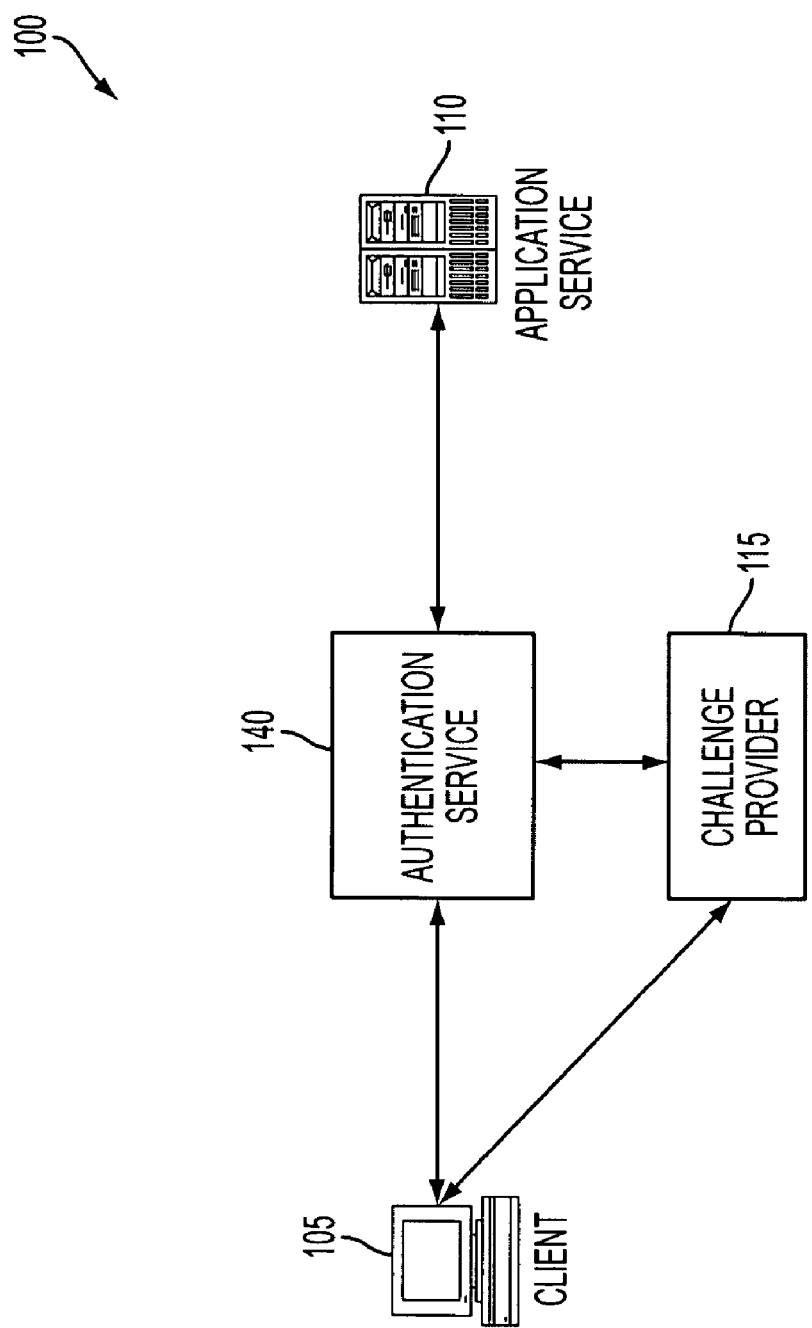
FIG. 1 is a schematic diagram of a system for providing secured access to an application service using a challenge provider.

Referring to FIG. 1, a generalized system 100 provides a client 105 with secured access to an application service 110 using a challenge provider 115 and an authentication service 140. The authentication service 140 authenticates the client 105 to the application service 110 based on a challenge provided to the client 105 by the challenge provider 115. Exemplary components of the system 100 are described in greater detail below.

The client 105 generally may include any device, system, and/or piece of code that relies on another service to perform an operation and that communicates using a wired or wireless communication path. For example, the client 105 may include a fixed or a mobile device 107 such as a cellular telephone, a personal digital assistant (PDA), a pen-based computer, a notebook computer, or a workstation. The client 105 also may include a Web browser, an email client, a synchronization client (e.g., a calendar synchronization client, a task list synchronization client), an instant messaging (IM) client, a business productivity application (e.g., a word processor, a spreadsheet), and/or an operating system or operating system kernel residing on a fixed or a mobile device.

The client 105 additionally may include a secure storage function and a secure execution function. The client 105 may use the secure storage and secure execution functions, for example, to provide confidentiality, user authentication, application authentication, transaction authentication, and/or nonrepudiation. The client 105 may generate or interpret secure messages based on data encryption techniques, or may digitally sign a message.

To provide secure storage and secure execution, the client 105 may include specialized security hardware and software having a separate physical identity. For example, the secure storage and secure execution functions of the client 105 may include a memory and a processor that are not shared but are used only for secure execution and for secure storage related to the secure execution. The memory and processor may reside within a secured physical casing separated from other portions of the client 105. Secured software and data (e.g., cryptographic algorithms and cryptographic keys and certificates) may be stored and executed using the memory and processor secured within the physical casing to prevent observation or modification by an eavesdropper. The client 105 may include, for example, a SIM toolkit browser that may integrate with a wireless identity module (WIM) of the challenge provider 115, the authentication service 140, or the application service 110. The secure storage and secure execution functions of the client 105 also may include a random number generator (RNG) and/or an internal clock mechanism. The internal clock mechanism may be used, for example, to time stamp a secure message.

In one such implementation, the client 105 includes a smart card or other suitable processor and/or memory card (e.g., a universal serial bus (USB) token, a GSM SIM, and/or a UMTS SIM (USIM)) that is capable of providing secure storage and secure execution. The smart card may be defined, for example, by standards such as the International Organization for Standardization (ISO) 7816-X, the ISO and International Electrotechnical Commission (IEC) 14443-1 specification, the European Telecommunication Standards Institute specification for GSM SIMs, and/or the Europay International, Master Card International, and Visa International (EMV) specification for payment systems. The smart card may decrypt received secure messages, encrypt requests or replies to form outgoing secure messages, and may communicate using the secure messages. The secure messages may include voice and/or non-voice data.

In another aspect, the secure storage and secure execution functions of the client 105 may be implemented using, for example, general resources of the client through tamper resistant software (TRS) that is resistant to observation and modification. The TRS may employ interleaving of its operations, and the TRS code may be self-encrypting, self-decrypting, and/or self-modifying. The TRS may be configured to store secrets dispersed through multiple memory structures, and to process those secrets only through multiple operations. Each TRS implementation may include a unique code sequence and/or cryptographic key, and the correct performance of a TRS code sequence may depend on the mutually correct execution of many other TRS code sequences.

The client 105 may employ a one-way cryptographic method (i.e., the encrypted output cannot be decrypted) that, for example, may be useful for authentication or to verify a validation. A one-way cryptographic function produces a fixed size number (e.g., a hash value) for an input of any length, where, additionally, it is infeasible computationally to determine the input from the hash value. Slightly different inputs to a one-way cryptographic function typically will produce substantially different outputs. One-way cryptographic functions include, for example, the secure hash algorithms (e.g., SHA-1, or SHA-256) and the message digest algorithms (e.g., MD4, MD5, or Ripe-MD).

The client 105 also may employ two-way cryptographic methods (i.e., the encrypted outputs can be decrypted) that are symmetric and/or asymmetric. In a symmetric cryptographic method, a shared key is employed that is used both to encrypt and to decrypt a message. The shared key may be used once to secure a given message and discarded, or the security token 110 may store the shared key for repeated use. In either event, the shared key may be communicated to the challenge provider 115 or the authentication service 140 using conventional key exchange methods. Symmetric cryptographic methods include, for example, the data encryption standard (DES), the 3DES (triple DES), the Blowfish encryption algorithm, the international data encryption algorithm (IDEA), and/or the advanced encryption standard (AES).

In an asymmetric cryptographic method, (e.g., the Rivest, Shamir, and Adelman (RSA) method, elliptic curve cryptography (ECC), digital signature algorithm (DSA), or Elgamal cryptography), a key-pair is used to encrypt and decrypt a message. The key-pair includes a public key for encrypting a message (but that provides no decryption benefit) and an associated private key for decrypting the message. Asymmetric cryptographic methods also may be used to create a digital signature. The digital signature may authenticate that a message author actually is the person or device that the message author claims to be and that the message has not been modified after being sent. Similar to encryption, a private key is used to create a digital signature while a message recipient uses an associated public key to authenticate the digitally signed message. For example, the client 105 may retain the private key used to digitally sign a message, but may make the public key available by publication to the challenge provider 115 or the authentication service 140 to verify the digital signature. A public key infrastructure (PKI) may certify to the challenge provider 115 or the authentication service 140 that the public key associated with the message corresponds to the source claimed by the message. The PKI fills a role similar to that of a notary public who witnesses the correct identity of a signer of a paper document. The PKI may include, for example, a certification authority or a web of trust.

Whether symmetric or asymmetric, the secure storage and secure execution functions, may be used exclusively to store and apply one or more secret cryptographic key. As a result, a third party eavesdropper is prevented from listening or observing communications or operations of the client 105 to intercept the secret cryptographic key.

The client 105 may format a message using any appropriate standard protocol for wired or wireless applications. The formatted message may include a form that a user of the client 105 may use to submit information to or make a request of the application service 110.

The application service 110 generally may include, for example, any device, system, and/or piece of code configured to perform an operation requested by a client 105 (e.g., a cellular telephone, a PDA, a Web browser, or another service). The application service 110 may include a customer relationship management (CRM) service, an enterprise resource planning (ERP) service, an email service, an accounting service, a resource management service, a synchronization service (e.g., a calendar synchronization service, a task list synchronization service), a print service, a file access service, an instant messaging (IM) service, an operating system, an operating system kernel, an authentication service, an authorization service, and/or any combination of these or other services. The application service 105 may include a fixed device, such as, for example, a desktop computer, a workstation, a mini-computer or a mainframe. The application service 110 also may include a mobile device, such as a mobile telephone, a personal digital assistant (PDA), a pen-based computer, or a notebook computer.

The application service 110 may include or access additional services. For example, the application service 110 may include or access a database service, such as, for example, a reliable database management system (RDBMS) or an SAP R/3 system. The database service may include, for example, enterprise information related to application services, users, and/or customers.

The application service 110 further may include various mechanisms for delivering voice and/or non-voice data, such as, for example, the short message service (SMS), the wireless application protocol (WAP), the transport connection protocol (TCP), the Internet protocol (IP), the World Wide Web, one or more local area networks (LANs), one or more wireless LANs (WLAN), and/or one or more wide area networks (WANs). The application service 110 also may include analog or digital wired and wireless telephone networks, e.g., public switched telephone networks (PSTN), integrated services digital networks (ISDN), various types of digital subscriber lines (xDSL), advance mobile telephone service (AMPS), global system for mobile communications (GSM), general packet radio service (GPRS), code division multiple access (CDMA), wideband CDMA (WCDMA), time division multiple access (TDMA), universal mobile telecommunications system (UMTS), radio, cable, satellite, and/or other delivery mechanisms for carrying voice or non-voice data.

The challenge provider 115 may employ cryptographic methods similar and complementary to those employed by the client 105. The challenge provider 115 also may include a secure storage function and a secure execution function. The secure storage and secure execution functions of the challenge provider 115 may be used to provide, for example, confidentiality, user authentication, application authentication, transaction authentication, and/or nonrepudiation. The challenge provider 115 may control access to the application service 110 by providing to the client 105 a challenge required to obtain authentication by the authentication service 140. In one aspect, the challenge provider 115 may provide the challenge to the client 105 only after the challenge provider 115 performs an initial authentication of an identity of the client 105. For example, to obtain the challenge, the client 105 may provide the challenge provider 115 with an identification certificate, password, and/or other form of identification. In addition, the challenge provider 115 may be accessible to the client 105 only via a secure communication connection (e.g., a point-to-point, non-public communication link).

The challenge provider 115 may be configured to control access of more than one client 105 to more than one application service 110 using more than one authentication service 140. Hence, the challenge provider 115 may centrally control access to an array of application services 110 using an array of authentication services 140. For example, the challenge provider 115 may provide a challenge that a client 105 may use to access more than one application service 110 using only a single password or other identifier (e.g., a personal identification number (PIN), a password, or a biometric indicator). To provide increased security, the challenge provider 115 may be configured to refuse communication with a client 105 after a predetermined number of failed authentication attempts. The challenge provider 115 also may include an internal clock and may be configured, for example, to refuse communication with a client 105 after a predetermined number of failed access attempts within a predetermined period of time.

To provide secure storage and secure execution, the challenge provider 115 may include a SIM or other specialized security hardware or software similar to client 105 described above. For example, the challenge provider 115 may include a wireless identity module (WIM) (e.g., a Giesecke & Devrient STARSIM browser system) that may integrate with the SIM toolkit browser of the client 105. In another aspect, the challenge provider 115 may be implemented using, for example, resources of an authentication service (e.g., authentication service 140) or of an enterprise service (e.g., application service 110) through tamper resistant software (TRS) similarly as was described above with respect to the client 105. The challenge provider 115 may be mobile or fixed, and may or may not communicate directly with the client 105 or the authentication service 140.

The authentication service 140 generally may include, for example, any device, system, and/or piece of code configured to secure access to the application service 110 by the client 105. The authentication service 140 may employ cryptographic methods similar and complementary to those employed by the client 105 and/or the challenge provider 115. The authentication service 140 may employ a first cryptographic technique to authenticate that the client 105 was challenged by the challenge provider 115. Having authenticated that the client received a valid challenge from the challenge provider 115, the authentication service 140 may employ a second cryptographic technique to authenticate that the client actually is the person or device that the client 105 claims to be. In addition to authenticating identity, the authentication service 140 may be configured to provide, limit, or deny access to the application service 110 based upon a privilege or status of the client 105. For example, a system administrator may be provided with extensive access to the application service, while a standard user may be provided with more limited access.

The authentication service 140 also may be configured to employ one or more protocols to guarantee freshness of a response provided by the client 105. For example, a replay counter technique may be used to prevent an eavesdropper from intercepting a correct response and then submitting the correct but no-longer fresh response to the authentication service 140 to access the application service 110. The replay counter technique may be based upon one or more time stamps included in the response.

In any event, the authentication service 140 provides secure execution and/or secure storage functions similar generally to those of the client 105 and challenge provider 115 previously described. For brevity, therefore, the description of the secure execution and secure storage functions is not repeated here, but is incorporated by reference. The authentication service 140 authenticates the client 105 using symmetric and/or asymmetric data encryption methods. The cryptographic methods of the authentication service 140 may be selected to operate seamlessly with the cryptographic methods of the client 105 and the challenge provider 115.

One or more other services may be included in the components of system 100, and these components (hereinafter the system services) may be included as part of one or more other services. For example, the system services may include or be included in a general-purpose or a special-purpose computer (e.g., a personal computer, a PDA, or a device specifically programmed to perform certain tasks), a Local Area Network (LAN), and/or a Wide Area Network (WAN). The response to and execution of instructions received by any or all of the system services may be controlled by, for example, a program, a piece of code, an instruction, a device, a computer system, or a combination thereof, for independently or collectively instructing the services to interact and operate as described herein.

Figure 2:
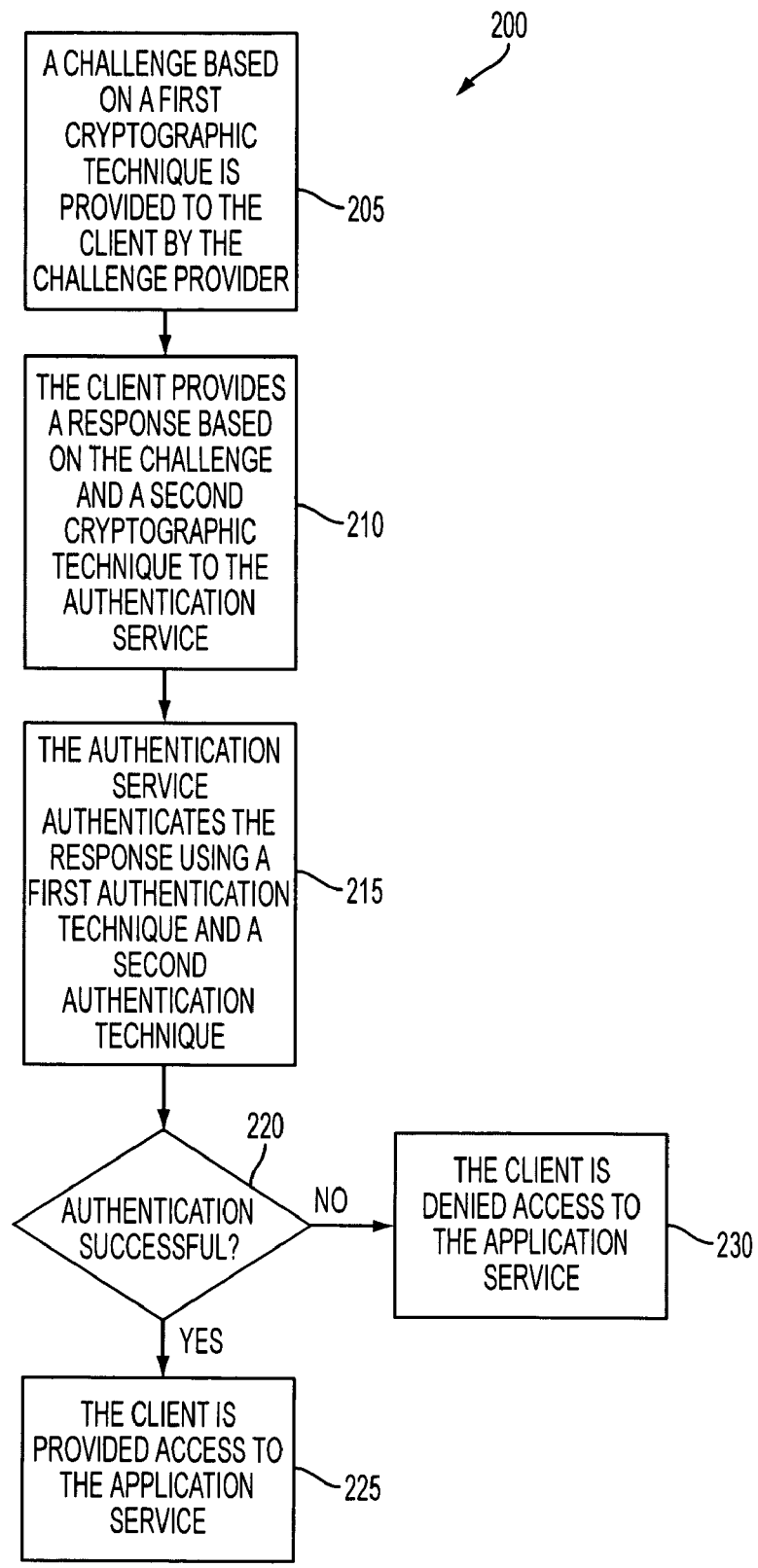
FIG. 2 is a flow diagram illustrating a process that may be implemented by the system of FIG. 1.

FIG. 2 illustrates a systematic process 200 implementable by, for example, the system of FIG. 1. The process of FIG. 2 may be applied in lieu of, as part of, or in addition to conventional authentication methods, such as, for example, the secure sockets layer (SSL) or transport layer security (TLS). The challenge provider 115 provides to the client 105 a challenge based on a first cryptographic technique (step 205). The challenge may be provided, for example, based on a request by the client 105 after the challenge provider 115 has obtained an initial authentication of the client 105. Generally, any number of cryptographic techniques may be envisaged to provide the challenge or to authenticate the client 105. The client 105 provides to the authentication service 140 a response based on the challenge using a second cryptographic technique (step 210). The authentication service 140 authenticates the response using a first authentication technique complementary to the first cryptographic technique to authenticate that the client 105 was challenged by the challenge provider 115 (step 215). The authentication service 140 also uses a second authentication technique complementary to the second cryptographic technique to authenticate that the client 105 is the person or device that the client 105 purports to be (step 215). If authentication is successful (step 220), then the client 105 is provided access to the application service 110 (step 225). Otherwise, the client is denied access to the application service 110 (step 230).

Figure 3:
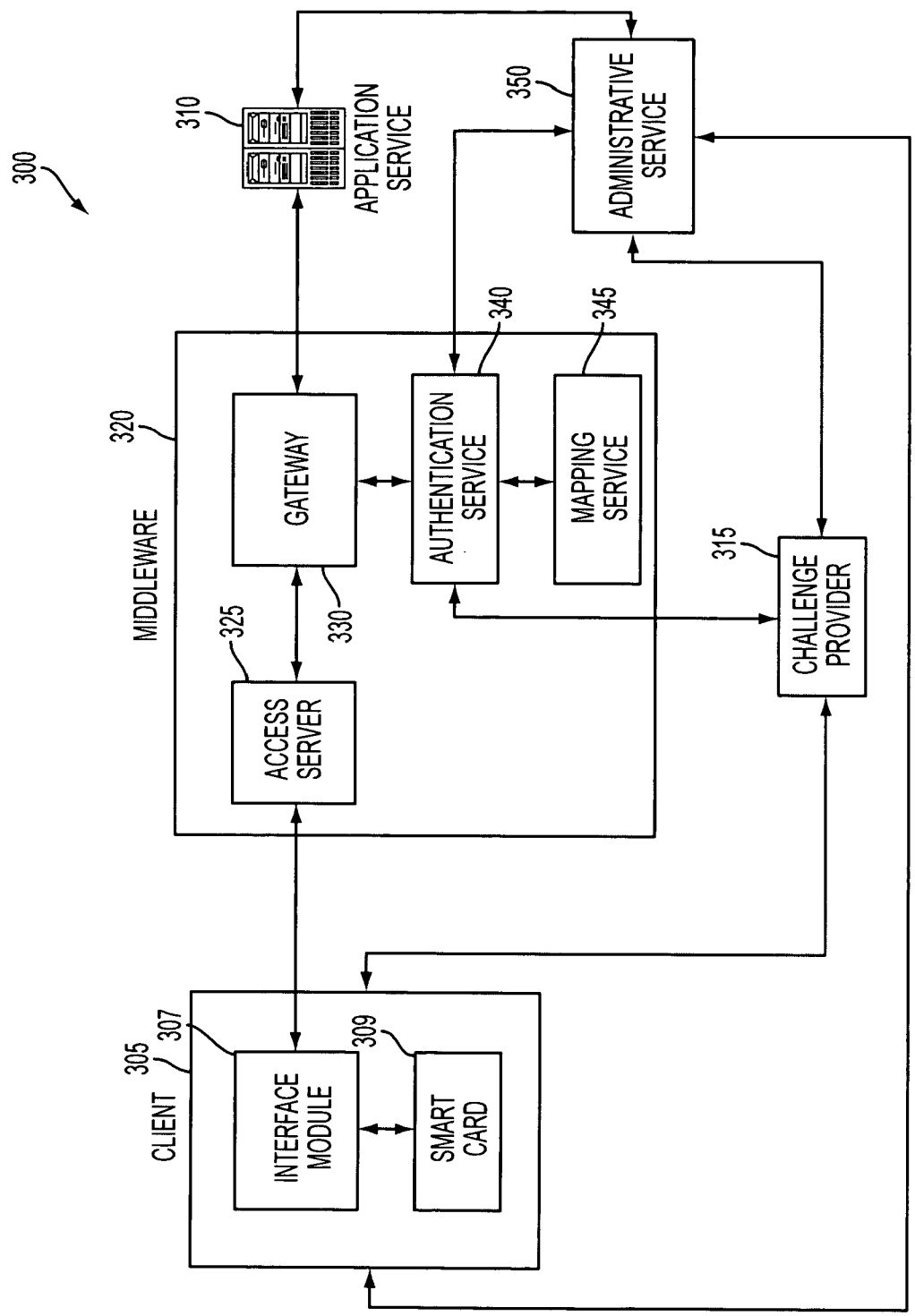
FIG. 3 is a schematic diagram illustrating an exemplary system for providing secured access to an application service using a challenge provider.

Referring to FIG. 3, a generalized system 300 secures access to an application service 310 using a challenge provider 315 and an authentication service 340. System 300 is similar generally to system 100 of FIG. 1.

The client 305 includes an interface module 307 and a smart card 309 that are configured to communicate together. The system 300 includes middleware 320 configured to link the client 305 and the application service 310. The middleware 320 may include, for example, an access server 325 (e.g., a web server) and a gateway 330. The access server 325 and the gateway 330 may or may not be integrated together. The middleware 320 also includes the authentication service 340 and a mapping service 345. System 300 includes additionally an administrative service 350 configured to manage one or more aspects of a security infrastructure. System 300 may employ elements of public key cryptography and the administrative service 350 may include a public key infrastructure (PKI). For brevity, this description focuses on those aspects of system 300 additional to the system of FIG. 1. Exemplary components of system 300 are described in greater detail below.

The client 305 is analogous to the client 105 of FIG. 1. However, client 305 is shown to include an interface module (e.g., interface module 307 provided by the challenge provider 315) and a smart card 309. The interface module 307 is configured to facilitate communication between the smart card 309 and the challenge provider 315 and/or between the smart card 309 and the authentication service 340. The interface module 307 may comprise, for example, a browser plug-in, a ActiveX component, a Java applet, and/or other software and/or hardware components. The smart card 309 may correspond generally to the smart card described with respect to client 105 of FIG. 1. In any event, the client 305 may include a hardware device configured physically to receive the smart card 309 and to enable operation of the smart card 309. The client 305 also may include, for example, a Web browser, an email client, a synchronization client (e.g., a calendar synchronization client or a task list synchronization client), an IM client, a business productivity application (e.g., a word processor or a spreadsheet program), an operating system or operating system kernel, and/or a virtual private network (VPN) (e.g., based on the IP security (IPsec) protocol).

The client 305 may be arranged to operate within or in concert with one or more other systems, such as, for example, analog or digital wired and wireless telephone networks (e.g., PSTN, ISDN, xDSL, AMPS, GSM, GPRS, CDMA, WCDMA, and UMTS), radio, cable, satellite, and/or other delivery mechanisms for carrying voice or non-voice data. Other mechanisms may include SMS, WAP, TCP, IP, the World Wide Web, one or more LANs (e.g., a WLAN) and/or one or more WANs.

The challenge provider 315 generally is analogous to the challenge provider 115 of FIG. 1. In one aspect, the challenge provider 315 may include a secure server (e.g., a secure web application server) with associated software to function as described previously. In addition to the challenge, the challenge provider 315 may provide the client 305 with the interface module 307 as, for example, an ActiveX component, a Java Applet, and/or some other type of executable software component. The challenge provider 315 may provide the interface module 307 based on information that the client 305 does not include yet the interface module 307 or that a version of the interface module 307 currently held by the client 305 is outmoded or inappropriate. Additionally, the challenge provider 315 may provide the interface module 307 based on information indicating a hardware and/or software configuration of the client 305. The challenge provider 315 may provide the interface module 307 to the client 305 based on information determined by the challenge provider 315 and/or based on externally provided information, such as, for example, an externally provided administrative instruction. The challenge provider 315 may encrypt or digitally sign the interface module 307 provided to the client 305.

The middleware 320 may be configured to connect the client 305 and the application service 310. The middleware 320, for example, may include the access server 325 and the gateway 330. The access server 325 communicates with the client 305 using the hyper-text transfer protocol (HTTP) and/or any other suitable communication protocol or service, such as, for example, TCP/IP, SMS, WAP, PSTN, ISDN, xDSL, AMPS, GSM, GPRS, CDMA, WCDMA, TDMA, or UMTS. The gateway 330 manages user logon data, session contexts and time-outs. The gateway 330 also communicates with the access server 325 and with the application service 310 and may employ one or more of the protocols described with respect to the access server 325 and/or any other appropriate public or proprietary communication protocol. More specifically, the gateway 330 may communicate with the application service 310 using one or more communication protocols configured to provide secure network communication, such as, for example, the secure socket layer (SSL), transport layer security (TLS), secure HTTP (S-HTTP), Kerberos, SECUDE, secure multipurpose internet mail extensions (S/MIME), security assertion markup language (SAML), cryptographic message syntax standard (PKCS), secure internet message access protocol (IMAPS), and/or secure post office protocol (POPS).

The authentication service 340 resides within the middleware 320, for example, as a component of the gateway 330. The authentication service 340 may include, for example, an application programming interface (API) and/or dynamic link library (DLL) for interfacing and operating with the middleware 320 (e.g., with the gateway 330). The authentication service 340 verifies the response of the client 305 to the challenge of the challenge provider 315. Specifically, the client 305 communicates the response to the authentication service 340 via the access server 325 and the gateway 330. The authentication service 340 may provide secure storage and secure executions functions using software and/or hardware components similar generally to those described with respect to the challenge provider 315. The authentication service 340 also may provide more than one method of authentication for a given user. For example, the authentication service 340 may prefer to authenticate a user using an authentication certificate but may provide alternative and/or additional authentication based upon a password or biometric if the authentication certificate is unavailable.

A mapping service 345 also is included to map the client identifier of client 305 to one or more associated cryptographic keys. The mapping service 345 may be included in the middleware 320, for example, as part of the authentication service 340, and/or as a component of the application service 310. The mapping service 345 may include a database (e.g., a relational database) for storing and retrieving identification information and/or authentication credentials such as cryptographic keys or certificates. The database may reside and operate within secure storage and/or secure execution functions of the mapping service 345. The secure storage and secure execution functions may be similar to those described with respect to the challenge provider 315 and the authentication service 340.

In one implementation, the mapping service 345 maps authentication credentials using components of the middleware 320, but maps identification information using components of the application service 310. For example, the mapping service 345 maps authentication credentials used by the authentication service 340 to authenticate a user. Successful authentication of the user "triggers" the mapping service 345 to map the identification information using components of the application service 310. For example, the mapping service 345 may use the application service 310 to map a user identification provided by mobile client 305 (a less trusted device) to a user or client identification used by a trusted system such as the application service 310 and/or other backend or middleware systems. The application service 310 may include a database (e.g., a relational database) used by the mapping service 345 to store and retrieve the identification information. The database may reside and operate within secure storage and/or secure execution functions of the application service 310.

The administrative service 350 may manage one or more aspects related to securing access to the application service 310. The administrative service 350, for example, may communicate with one or more devices of the system 300 using an end-to-end secured communication. The administrative service 350 may store, alter, validate, revoke, or generate security credentials, such as certificates or cryptographic keys used by the system 300. The administrative service 350 may include a public key infrastructure (PKI) configured to certify that a public key associated with a communication corresponds to an alleged source of the communication. The administrative service 350 also may include a policy management service configured to effectuate a state change in a device of system 300 based on a change in a security-related policy (e.g., a security-related policy of the application service 310). The administrative service 350, for example, may instruct access to be limited or denied based upon a privilege or status of the client 305.

Additionally, the administrative service 330 may instruct the challenge provider 315 regarding provision of the interface module 307 to the client 305. For example, the administrative service 350 may control the version of the interface module 307 to be provided and/or the timing or interval at which an already installed interface module 307 is updated or replaced.

One or more other services may be included in the components of system 300, and/or these components (hereinafter the system services) may be included as part of one or more other services. For example, the system services may include or be included in a general-purpose or a special-purpose computer (e.g., a personal computer, a mobile device, or a device specifically programmed to perform certain tasks), at least one Local Area Network (LAN), and/or at least one Wide Area Network (WAN). Either way, the response to and execution of instructions received by any or all of the system services may be controlled by, for example, a program, a piece of code, an instruction, a device, a computer system, or a combination thereof, for independently or collectively instructing the services to interact and operate as described herein.

Figure 4:
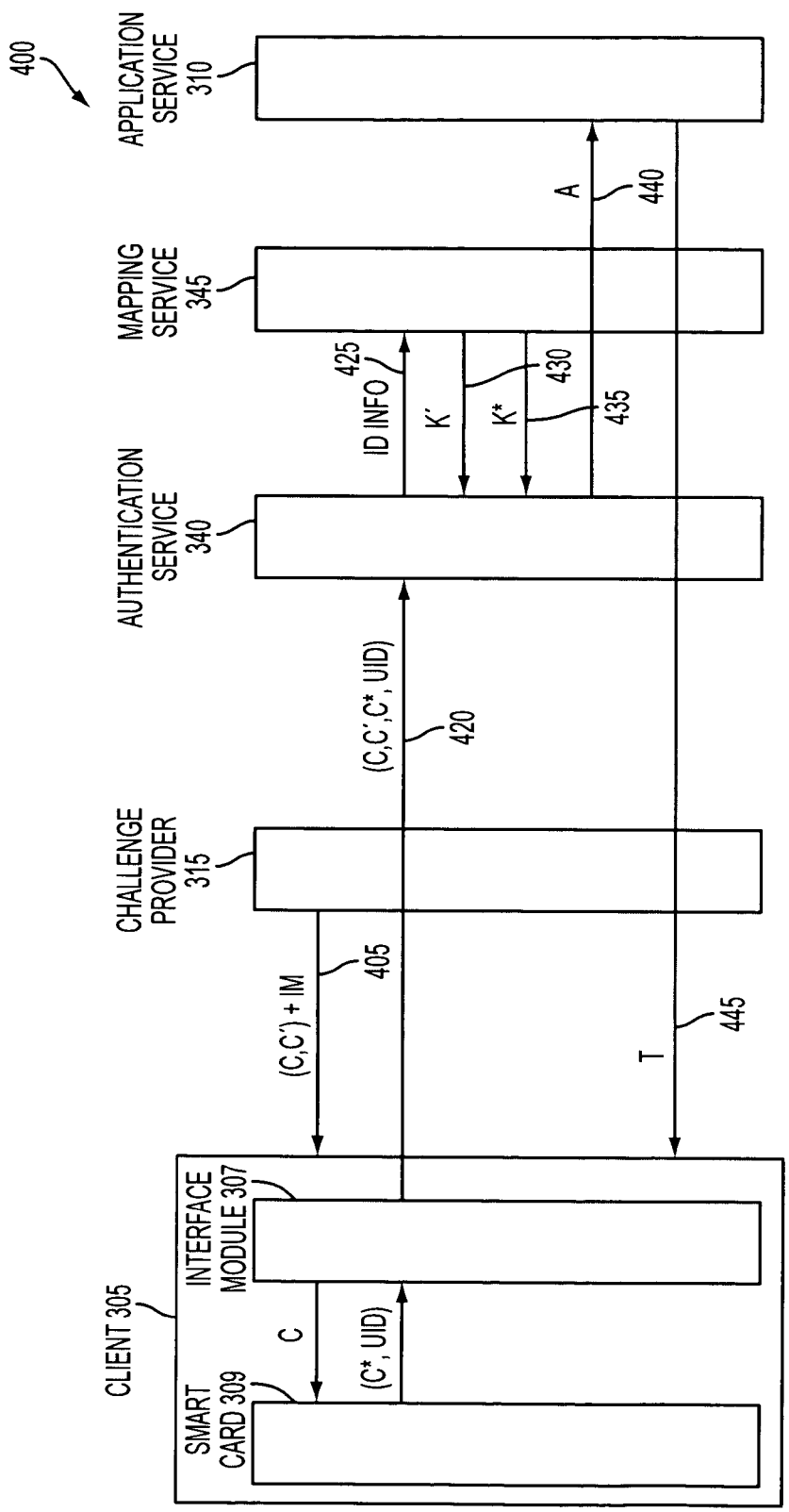
FIG. 4 is a data flow diagram illustrating a process that may be implemented by the system of FIG. 3.

FIG. 4 illustrates a data flow diagram showing a process 400 that may be used to implement the system of FIG. 3. The challenge provider 315 provides a challenge to the client 305 based on an action of the client 305, or, alternatively, based on its own initiative or upon some other input (step 405). The challenge may include challenge information C and an encrypted version of the challenge information, C'. The challenge information C may include, for example, a random value (RND), a time stamp of the current time (T_Stamp), and/or an identification of the challenge provider 315 (CP_ID). The challenge provider 315 may transform the challenge information C using a first cryptographic technique to generate C'. For example, the challenge provider 315 may digitally sign the challenge information C, may encrypt the challenge information C, and/or may apply a hashing algorithm to the challenge information C. The challenge also may include other or additional information, and may be structured in any appropriate configuration.

In addition to the challenge (C, C'), the challenge provider 315 also may provide the interface module 307 (IM) to the client 305. The interface module 307 may be provided based on a communication (not shown) of the administrative service 350, as was described generally with respect to FIG. 3 above.

Upon receiving the challenge and the interface module 307 (IM), the client 305 may install the interface module 307 (IM). Once installed, the interface module 307 (IM) provides the challenge information C to the smart card 309 (step 410). The smart card 309 transforms the challenge information C using a second cryptographic technique to generate C*. For example, the smart card 309 may digitally sign the challenge information C, may encrypt the challenge information C, and/or may apply a hashing algorithm to the challenge information C. The smart card 309 communicates the transformed challenge information C* to the interface module 307 and also provides a client and/or user identifier (UID) (step 415). The UID may include, for example, a digitally signed certificate, a personal identification number (PIN), a password, and/or a biometric indicator.

The interface module 307 provides a response to the authentication service 340 via the access server 325 and the gateway 330 (step 420). The response may include, for example, the challenge information C, the transformed challenge information C' and C*, and the client identifier UID. Based, for example, on the identifier CP_ID of the challenge provider 315 (part of the challenge information C) or the client identifier UID, the authentication service 340 provides identification information ID_Info to the mapping service 345 (step 425). The mapping service 345 uses the identifier CP_ID of the challenge provider 315 to provide to the authentication service 340 a cryptographic key K' of the first cryptographic technique used by the challenge provider 315 (step 430). In addition, the mapping service 345 uses the client identifier UID to provide to the authentication service 340 a cryptographic key K* of the second cryptographic technique used by the client 305 (e.g., used by the smart card 309 of the client 305) (step 435).

The authentication service 340 authenticates the response of the client 305 by using the keys K' and K* to authenticate respective portions of the response. Specifically, the authentication service 340 authenticates C', contributed by the challenge provider 315, using the key K' and a first authentication technique complementary to the first cryptographic technique. Authentication of C' using K' is described below in greater detail. In addition, the authentication service 340 authenticates C*, contributed by the client 305, using the key K* and a second authentication technique complementary to the second cryptographic technique. The authentication of C* is similar in material respects to authentication of C'. For brevity, therefore, the authentication of C* is not discussed in additional detail.

To authenticate C', the first authentication technique may verify that C' corresponds to a valid and expected output of the true challenge provider 315. In this aspect, the first authentication technique presumes that the input C is known (e.g., that C is included in the response) and that the cryptographic process expected of the true challenge provider 315 (e.g., application of the first cryptographic technique using K') also is known. Specifically, the first authentication technique may use K' and the first cryptographic technique to encrypt or hash C to produce C''. The value of C should equal that of C' if the challenge provider 315 is authentic and not an imposter. In short, the authentication service 340 authenticates C' if it is the same as C''.

To authenticate C' in another aspect, the first authentication technique verifies that the known input C may be derived using C', for example, by decrypting C' to produce C. Specifically, the first authentication technique uses a two-way cryptographic process associated with the true challenge provider 315 (e.g., application of the first cryptographic technique using the key K') to decrypt C' and produce C''. If C'' and C are the same, the authentication service 340 authenticates C'. If, however, the value of C'' does not equal C, then it is presumed that C' was generated by an imposter rather than the true challenge provider 315, and authentication is denied.

In another aspect, the first authentication technique may recognize C' as a digitally signed version of C. The first authentication technique may use K', a public key associated with the true challenge provider 315, and the first cryptographic technique to authenticate the digital signature of C' in a conventional manner.

Additional to authenticating C' and C*, the authentication service 340 also may verify the freshness of the response provided by the client 305. For example, the authentication service 340 may verify that C' was created and/or provided within a predetermined period of time based on the time stamp information (T_Stamp) of the challenge information. If the authentication service 340 determines that C' is not fresh, the authentication service may refuse to authenticate the response of the client 305. Alternatively, or in addition, the authentication service 340 may determine freshness based on time stamp information provided by the smart card 309 in the response.

Once the response is authenticated, the authentication service 340 authenticates the client 305 to the application service 310 via the gateway 330 (step 440). Although not shown, authentication may trigger the mapping service 345 to determine a back-end identifier UID' based on the client identifier UID. The mapping service 345 may communicate the back-end identifier UID' to the other system services as needed or appropriate. In any event, the application service 310 provides a session ticket to the client 305 via the gateway 330 and the access server 325 (step 445). The client 305 may use the session ticket to access the application service 310.

Generally, any number of methods may be envisaged to authenticate a client based on a challenge provider. Other implementations, therefore, are within the scope of the following claims.

What is claimed is:

1. A system for providing secured access to an application service, the system comprising:
   a secure server including a challenge provider configured to:
      initially authenticate an identity of a client that seeks access to the application service,
      transmit an executable software component to the client based on information regarding the client, the executable software component to be executed by the client to communicate a response, and
      issue a challenge based on a first cryptographic technique to the client if the identity of the client is authenticated, the challenge comprising data that requires the response, wherein the challenge is issued in response to an action of the client; and
   an access server that interfaces with the client through the executable software component, and that includes an authentication service configured to:
      receive challenge information from the challenge provider,
      receive the response from the client, the response being based on the challenge and being encrypted at the client using a second cryptographic technique different from the first cryptographic technique,
      map the response from the client to determine a first key corresponding to the first cryptographic technique based on the challenge information, and to determine a second key corresponding to the second cryptographic technique, and
      allow the client to access the application service, if the response is authenticated using the first key to authenticate that the client was challenged by the challenge provider, and if the client is authenticated using the second key to authenticate the identity of the client.

2. The system of claim 1 wherein:
   the client includes a secure storage circuit and a secure execution circuit configured to generate the response based on the challenge and the second cryptographic technique; and
   the challenge provider is configured to provide to the client an interface module as the executable software component for communicating the challenge to the secure storage circuit or the secure execution circuit and for communicating the response to the authentication service.

3. The system of claim 2 wherein the challenge provider is configured further to select the interface module from one or more available interface modules.

4. The system of claim 2 wherein the challenge provider is configured to provide the interface module based on a version or type of the client.

5. The system of claim 2 wherein the challenge provider is configured to provide the interface module using a digital signature.

6. The system of claim 2 further comprising an administrative service and wherein the challenge provider is configured to provide the interface module based on an instruction of the administrative service.

7. The system of claim 6 wherein the challenge provider is configured to centrally control access of more than one client to more than one application service using more than one authentication service.

8. The system of claim 1 wherein the authentication service is comprised within a middleware service configured to connect the client and the application service.

9. The system of claim 1 further comprising a mapping service configured to map identification information to one or more cryptographic keys.

10. The system of claim 1 further comprising a mapping service configured to map identification information associated with a less trusted service to identification information associated with a more trusted service using stored identification information.

11. The system of claim 1 wherein the challenge provider is further configured to provide the client with an interface module as the executable software component that is installed on the client and that provides the response to the authentication service.

12. A computer having a computer program stored therein for providing secured access to an application service, the computer program including instructions that, when executed, cause the computer to execute operations comprising:
generating a challenge provider at a secure server, the challenge provider configured to:
initially authenticate an identity of a client computer that seeks access to the application service,
transmit an executable software component to the client computer based on information regarding the client, the executable software component to be executed by the client to communicate a response, and
cause a challenge computer to issue a challenge based on a first cryptographic technique to the client computer if the identity of the client computer is authenticated, the challenge comprising data that requires the response, wherein the challenge is issued in response to an action of the client computer;
establishing communication between the client computer and an access server through the executable software component; and
generating an authentication service at the access server, the authentication service configured to:
receive challenge information from the challenge computer,
receive the response from the client computer, the response being based on the challenge and being encrypted at the client computer using a second cryptographic technique different from the first cryptographic technique,
map the response from the client computer to determine a first key corresponding to the first cryptographic technique based on the challenge information, and to determine a second key corresponding to the second cryptographic technique, and
allow the client computer access to the application service, if the response is authenticated using the first key to authenticate that the client was challenged by the challenge provider, and if the client computer is authenticated using the second key to authenticate the identity of the client computer.

13. The computer of claim 12, wherein:
the client computer executes a secure storage code segment and a secure execution code segment configured to cause the client computer to generate the response based on the challenge and the second cryptographic technique; and
wherein the challenge provider is configured further to cause the challenge computer to provide to the client computer an interface module code segment as the executable software component configured to communicate the challenge to the secure storage code segment or the secure execution code segment and for communicating the response to the authentication computer.

14. The computer of claim 13 wherein the challenge provider is configured to provide the interface module code segment based on an instruction of an administrative service.

15. The computer of claim 14 wherein the challenge provider is configured further to centrally control access of more than one client computer to more than one enterprise computer using more than one authentication computer.

16. The computer program of claim 12 wherein the challenge provider is further configured to provide the client with an interface module as the executable software component that is installed on the client and that provides the response to the authentication service.

17. A method of providing secured access to an application service, the method comprising:
configuring a challenge provider of a secure server to:
initially authenticate an identity of a client that seeks access to the application service,
transmit an executable software component to the client based on information regarding the client, the executable software component to be executed by the client to communicate a response, and
issue a challenge based on a first cryptographic technique to the client if the identity of the client is authenticated, the challenge comprising data that requires the response, wherein the challenge is issued in response to an action of the client;
providing an access server that interfaces with the client through the executable software component, and that includes an authentication service; and
configuring the authentication service to:
receive challenge information from the challenge provider,
receive the response from the client, the response being based on the challenge and being encrypted at the client using a second cryptographic technique different from the first cryptographic technique, and
map the response from the client to determine a first key corresponding to the first cryptographic technique based on the challenge information, and to determine a second key corresponding to the second cryptographic technique,
allow the client to access the application service, if the response is authenticated using the first key to authenticate that the client was challenged by the challenge provider, and if the client is authenticated using the second key to the second cryptographic technique to authenticate the identity of the client.

18. The method of claim 17 further comprising:
configuring the client to include a secure storage circuit and a secure execution circuit to generate the response based on the challenge and the second cryptographic technique; and
configuring the challenge provider to provide to the client an interface module as the executable software component for communicating the challenge to the secure storage circuit or the secure execution circuit and for communicating the response to the authentication service.

19. The method of claim 18 further comprising:
providing an administrative service configured to provide an instruction to the challenge provider regarding the providing of the interface code segment.

20. The method of claim 19 comprising further configuring the challenge provider to control centrally access of more than one client to more than one application service using more than one authentication service.

21. The system of claim 17 wherein the challenge provider is further configured to provide the client with an interface module as the executable software component that is installed on the client and that provides the response to the authentication service.

* * * * *